United States Patent [19]
Chaisemartin

[11] Patent Number: 5,568,485
[45] Date of Patent: Oct. 22, 1996

[54] PRIORITY ENCODER

[75] Inventor: Philippe Chaisemartin, Sainte Agnes, France

[73] Assignee: SGS-Thomson Microelectronics S.A., St. Genis Pouilly, France

[21] Appl. No.: 298,075

[22] Filed: Aug. 30, 1994

[30] Foreign Application Priority Data

Aug. 31, 1993 [FR] France ............... 93 10576

[51] Int. Cl.⁶ ............................................. G06F 13/00
[52] U.S. Cl. ............................ 370/85.6; 340/825.51; 395/732; 395/860; 364/230.1; 364/242.6
[58] Field of Search ................... 370/85.6, 85.2, 370/85.4, 85.8; 395/732, 735, 821, 860, 859; 340/825.51, 825.5

[56] References Cited

U.S. PATENT DOCUMENTS

| | | | |
|---|---|---|---|
| 5,039,986 | 8/1991 | Gergiou | 370/58.1 |
| 5,083,258 | 1/1992 | Yamasaki | 395/725 |
| 5,083,261 | 1/1992 | Wikie | 395/725 |
| 5,095,460 | 3/1992 | Rodeheffer | 395/650 |
| 5,160,923 | 11/1992 | Sugawara et al. | 370/85.6 |
| 5,257,383 | 10/1993 | Lamb | 395/725 |
| 5,265,215 | 11/1993 | Fukuda et al. | 395/725 |
| 5,265,258 | 11/1993 | Fiene et al. | 395/725 |
| 5,321,640 | 6/1994 | Anderson et al. | 364/715.1 |

FOREIGN PATENT DOCUMENTS

| | | | |
|---|---|---|---|
| 3334123 | 4/1985 | Germany | G06F 9/46 |
| 4024029 | 1/1992 | Germany | G06F 15/16 |
| 2225919 | 6/1990 | United Kingdom | H04L 11/16 |

OTHER PUBLICATIONS

IBM Technical Disclosure Bulletin, vol. 29, No. 3, Aug., 1986 Armonk, NY, US pp. 1361–1362.

*Primary Examiner*—Benedict V. Safourek
*Assistant Examiner*—Seema S. Rao
*Attorney, Agent, or Firm*—David M. Driscoll; James H. Morris

[57] ABSTRACT

A circular priority encoder includes a linear priority encoder that receives a plurality of requests of ranks 1 to n on corresponding request lines. The encoder acknowledges on an acknowledgement output the request of the lowest rank among the requests it receives; a mask register is connected to transmit to the linear encoder only the requests whose ranks are determined to be active by the ranks of active bits of a mask contained in the mask register. A mask generator provides the mask register with a mask in which bits of ranks 1 to i (i=1, 2 ... n) are inactive and the remaining bits are active when a request of rank i is acknowledged by the linear encoder.

26 Claims, 2 Drawing Sheets

PRIORITY ENCODER

BACKGROUND OF THE INVENTION

1. Field of the Invention

The present invention relates to priority encoders.

2. Discussion of the Related Art

Priority encoders are circuits that serve to acknowledge the request having the highest priority from among a plurality of requests arriving as active signals to the encoder. A request acknowledgement includes enabling a circuit (often a microprocessor) so that the circuit, for example, executes the task corresponding to the request.

A priority encoder may receive one or a plurality of simultaneous requests on respective request lines assigned with respective ranks, for example from 1 to n. The priority encoder acknowledges one request at a time through acknowledgement lines. In some encoders, the acknowledgement lines directly correspond to request lines, and the encoder transmits on the acknowledgement lines the acknowledged request only. In some other encoders, the acknowledgement lines provide the binary rank of the acknowledged request.

There are two types of priority encoders: so-called "linear" encoders and so-called "circular" encoders.

In linear encoders, the priorities assigned to the request lines are distinct, the priorities being, for example, assigned by decreasing order to the ranks of the request lines. Linear encoders always acknowledge the request of lowest rank, and a request of a determined rank is not acknowledged as long as there remains requests of lower ranks.

Linear encoders are conventionally implemented as a non-sequential logic circuit, of the carry propagation type, that acknowledges the request of the lowest rank shortly after any change in the states of the request lines. The actual delay depends on the carry propagation time of the circuitry.

In circular encoders, the request lines are each assigned a same priority level. Such an encoder must ensure, when several requests are active at the same time, that each of these requests is acknowledged at a given time.

To achieve this purpose, conventional circular encoders are formed by a sequential logic circuit that circularly polls the request lines at a predetermined clock rate. At each clock cycle, the sequential circuit polls one request line. If the request line that is polled is active, the corresponding acknowledgement is transmitted, and the polling of the request lines then continues from the last line that was polled. When the request line of last rank, n, is polled, polling is resumed from the request line of rank 1, and so on.

Thus, a drawback of the above-mentioned circular encoders is that they process only one request line at each clock cycle. In other words, if the circuit polls the line of rank i whereas the next active request is of rank j (j>i), the request of rank j is acknowledged only j–i clock cycles later.

SUMMARY OF THE INVENTION

Thus, an object of the present invention is to provide a circular priority encoder that acknowledges requests of any rank at successive clock cycles.

A further object of the present invention is to provide a dual priority encoder that programmably processes part of the requests as requests of distinct priority (linear encoding), and another part of the requests as requests of the same priority (circular encoding), while acknowledging one request at each clock cycle.

These objects are achieved according to the invention with a circular priority encoder including a linear priority encoder that receives a plurality of requests of ranks 1 to n on corresponding request lines, and that acknowledges on an acknowledgement output the request of the lowest rank among the requests it receives. A mask register is provided so that the linear encoder only receives the requests whose ranks are determined to be active as indicated by the ranks of active bits in the mask register, i.e., the mask. A mask generator provides the mask register with a mask in which bits of rank 1 to i (i=1, 2 ... n) are inactive and the remaining bits are active when a request of rank i is acknowledged by the linear encoder.

According to an embodiment of the invention, the mask register includes an initialization input that is enabled when the acknowledgement output of the linear encoder is at zero.

The invention also provides a priority encoder that further includes a mechanism for forcing to an active state selected bits of the masks provided by the mask generator.

According to an embodiment of the invention, the encoder includes a mechanism for authorizing the loading of a mask in the mask register only if the acknowledged request corresponds to the bits that are not forced to an active state of the masks.

The foregoing and other objects, features, aspects and advantages of the invention will become apparent from the following detailed description of the present invention when taken in conjunction with the accompanying drawings.

DETAILED DESCRIPTION

Figure 1:
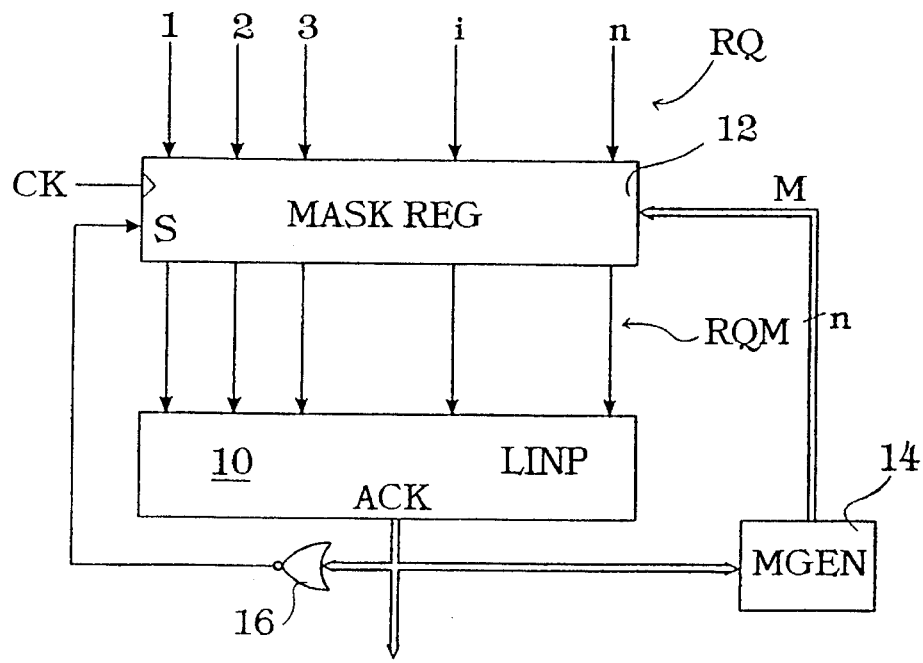
FIG. 1 represents an embodiment of a circular priority encoder according to the invention.

In FIG. 1, a circular priority encoder according to the invention includes a linear priority encoder 10. The linear encoder 10 receives request lines of ranks 1 to n through a mask register 12. The request lines connected to the input of the mask register are labeled RQ; the request lines connected between the mask register and the linear encoder 10 are labeled RQM. The acknowledgement output ACK of the linear encoder 10 is connected to a mask generator 14 that provides the mask register 12 with a mask M, which is a function of the rank of the request acknowledged by the linear encoder 10.

A mask M provided by the mask generator 14 includes one bit associated with each request line RQ. The mask register 12 is such that an active state of a request line RQ is transmitted to the linear encoder 10 only if the corresponding bit of the mask is active, for example at 1.

In addition, the mask register 12 receives a clock signal CK that causes, at each rising edge for example, the storage of the states of the request lines RQ and of the mask M that is provided by the mask generator 14. The mask register 12 includes an asynchronous "set" input S (which, as soon as it is enabled, sets to "1" the mask bits in the mask register).

The set input S is enabled when the linear encoder 10 does not have any request to acknowledge, that is, when its output ACK is at 0. In practice, the output ACK is provided to a NOR gate 16 having its output provided to the set input S of the mask register 12.

The mask generator 14 is such that it provides a mask in which bits of ranks 1 to i are at "0" and the remaining bits are at "1" when the linear encoder 10 acknowledges the request of rank i. Such a mask generator can be easily achieved by those skilled in the art with logic gates.

Figure 2:
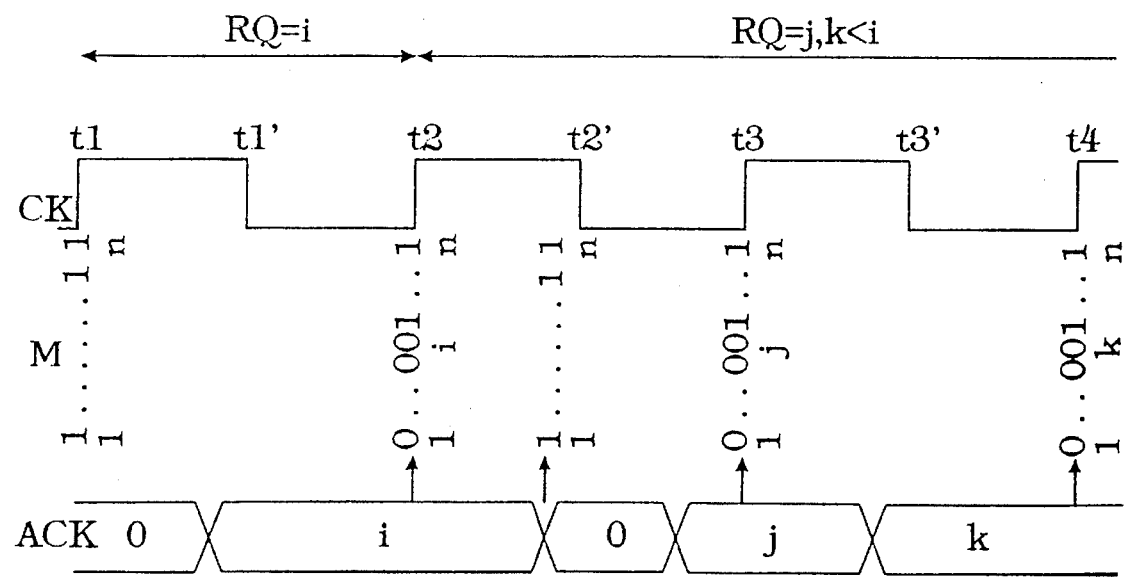
FIG. 2 is a timing diagram of the operation of the encoder of FIG. 1.

FIG. 2 illustrates, with a timing diagram, the operation of the circular encoder according to the invention. FIG. 2 illustrates the changes of the clock signal CK, of masks M loaded in the mask register 12, and the acknowledgement ACK of various requests. Times t1 to t4 designate successive rising edges of clock signal CK, and times t1' to t3' designate falling edges.

At time t1, an initial mask having all its bits at "1" is loaded into the mask register 12; the states of the request lines RQ are stored in register 12. The linear encoder 10 does not acknowledge any request, and its output ACK is at "0". All the requests on lines RQ are transmitted to the linear encoder 10. It is assumed that the line of rank i only is active. Shortly after time t1, for example near time t1' at the falling edge of clock signal CK, the linear encoder 10 acknowledges request i. As soon as request i is acknowledged, the mask generator 14 generates a mask M whose bits of ranks 1 to i are at "0" and whose remaining bits are at "1".

At time t2, the above-mentioned mask generated by the mask generator 14 is loaded in the mask register 12 and the states of the request lines RQ are stored. As indicated by the timing diagram of FIG. 2, lines RQ transmit new requests of ranks j and k (j<k) that are lower than rank i. However, with the mask that was loaded at time t2, requests of ranks j and k are masked; the linear encoder 10 thus does not receive any request on RQM. Near time t2', the linear encoder 10 provides value "0" on its acknowledgement output ACK. As soon as the acknowledgement output changes to "0", the mask register 12 is set to "1" through gate 16, thus causing the requests of ranks j and k to be transmitted to the linear encoder 10 on RQM. Thus, shortly after the transition to "0" of the acknowledgement output ACK, the linear encoder 10 acknowledges the request of rank j, because rank j is lower than rank k. The mask generator 14 then generates a mask M whose bits of ranks 1 to j are at "0", and its remaining bits are at "1".

At time t3, this new mask is loaded in the mask register 12, and the new requests on lines RQ are stored. The requests of ranks j and k are still active. However, the request of rank j is now masked and is not transmitted to the linear encoder 10. The request of rank k only is transmitted to the encoder 10 that acknowledges this request near time t3'. Upon this acknowledgement, the mask generator 14 generates a new mask M whose bits of ranks 1 to k are at "0" and its remaining bits are at "1", and so on.

The timing diagram of FIG. 2 shows that the circuit of FIG. 1 operates as a circular priority encoder with the advantage of acknowledging one active request at each clock cycle.

Acknowledgements are taken into account by other circuits, for example, at the rising edges of the clock signal CK. Thus, the transition to "0" of output ACK between times t2' and t3 is ignored.

Figure 3:
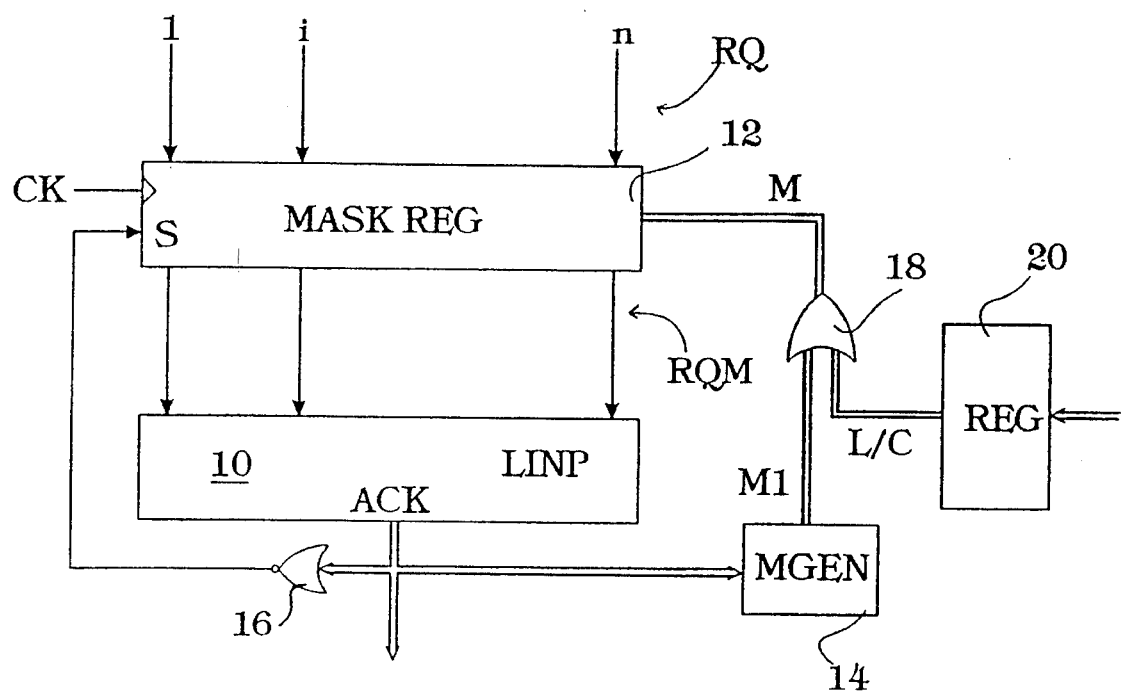
FIG. 3 represents an embodiment of the dual priority encoder according to the invention.

FIG. 3 represents an embodiment of a dual priority encoder according to the invention. This dual priority encoder processes requests of a lower rank as requests of distinct priorities (linear encoding), and processes requests of higher ranks as requests of identical priorities (circular encoding). In FIG. 3, the same elements as in FIG. 1 are labeled with same reference numerals.

In FIG. 3, a plurality of OR gates symbolized as one multiple gate 18 receives each bit from a register 20 and from a mask M1 provided by the mask generator 14. The outputs of the OR gates 18 provide the mask M to the mask register 12. With this configuration, if a bit of register 20 is at "1", the corresponding bit of mask M is always at "1", regardless of the mask M1 provided by the mask generator 14.

Because a priority encoder is generally associated with a microprocessor, the register 20 may be accessed in write mode by the microprocessor, which allows a program to write values in this register.

Assuming that the bits of ranks 1 to i of register 20 are at "1", the requests of ranks 1 to i are always transmitted to the linear encoder 10. Thus, the requests of ranks 1 to i are constantly processed in a conventional linear way by the linear encoder 10, as requests of distinct priorities. In contrast, the mask generator 14 operates as previously described, and the remaining requests, of ranks i+1 to n, are circularly processed.

Indeed, as long as a request of ranks 1 to i is active, the linear encoder 10 acknowledges the request having the highest priority among these active requests. The mask generator 14 provides at each of these acknowledgements a mask whose first bits are at "0" but that are forced to "1" by the OR gates 18.

In contrast, if there is no request of a rank between 1 and i, the circuit behaves circularly like the circuit of FIG. 1, for requests of ranks higher than i.

Figure 4:
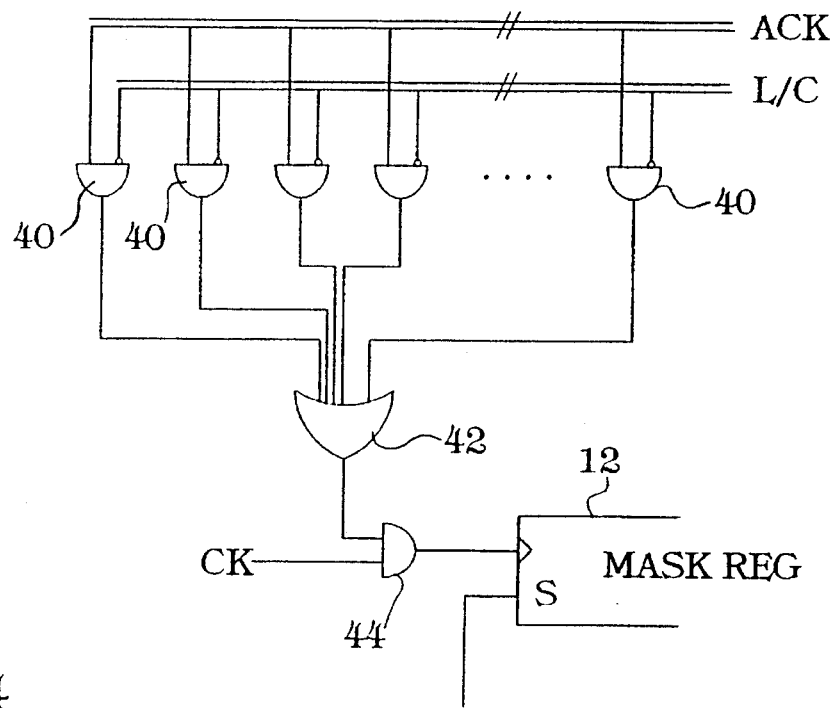
FIG. 4 represents an alternative embodiment of the dual priority encoder of FIG. 3.

FIG. 4 represents an exemplary logic circuit added to the circuit of FIG. 3 that allows the dual encoder according to the invention to circularly or linearly process the requests according to any combination determined by register 20.

The example described corresponds to the case where there are as many acknowledgement lines ACK as request lines RQ. Each acknowledgement line ACK is connected to a first input of a respective AND gate 40. Each output line L/C of register 20 is connected to a second inverting input of the corresponding AND gate 40. The outputs of gates 40 are connected to an OR gate 42.

With this configuration, the output of gate 42 is active only when a circular priority request is acknowledged. The output of gate 42 enables the transmission of the clock signal CK to the mask register 12 through an AND gate 44. Accordingly, a new mask M is loaded in the mask register 12 only if a circular priority request is acknowledged.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended to be limiting. The invention is limited only as defined in the following claims and the equivalents thereto.

What is claimed is:

1. A circular priority encoder, comprising:
   a linear priority encoder that receives a plurality of masked requests of ranks 1 to n on corresponding masked request lines, and that provides on an acknowledgment output an acknowledgment signal that identifies the masked request of the lowest rank among the masked requests it receives;

a mask register, receiving a plurality of requests of ranks 1 to n on corresponding request lines, and being connected to the linear priority encoder, the mask register holding a mask and having means for transmitting only the requests that are enabled by corresponding ranks of active bits of the mask; and a mask generator for providing a new mask to the mask register to replace the mask held by the mask register, the mask generator being constructed and arranged such that, when a request of rank i is identified by the acknowledgment signal provided by the linear priority encoder, the mask generator provides the new mask having inactive bits of rank 1 to i (i=1, 2 . . . n), the remaining bits of the new mask being active; and means for forcing selected bits of the new mask provided by the mask generator to an active state.

2. The circular priority encoder of claim 1, wherein the mask register includes an initialization input, and the circular priority encoder further includes means for detecting when the acknowledgment signal of the linear priority encoder is at zero, the means for detecting being connected to the initialization input to initialize the mask register, when the means for detecting detects that the acknowledgment signal is zero.

3. The circular priority encoder of claim 1, wherein the mask generator further includes means for loading the new mask into the mask register only if the masked request identified by the acknowledgment signal provided by the linear priority encoder does not correspond to one of the active bits of the mask held by the mask register.

4. The circular priority encoder of claim 1 wherein the means for forcing includes a register for storing force bits and a logic circuit that receives the new mask from the mask generator and also receives the force bits, the logic circuit forcing bits of the new mask to the same state as corresponding force bits.

5. A method for acknowledging a plurality of requests, each of the plurality of requests having an associated rank, the method comprising the steps of:

a) receiving the plurality of requests;

b) masking the plurality of requests with a mask to provide a plurality of enabled requests;

c) transmitting the plurality of enabled requests to a linear encoder;

d) receiving the plurality of enabled requests by the linear encoder, the linear encoder acknowledging the enabled request having the lowest rank of the plurality of enabled requests; and e) providing a new mask, to replace the mask of step b), that enables only those requests having a rank higher than the acknowledged request.

6. The method of claim 5 further including a step of detecting when the linear encoder does not acknowledge any request and, in response thereto, providing an initial mask to replace the mask of step b), that enables all requests.

7. The method of claim 5 further including a step of forcing selected bits of the mask of step b) to a predetermined state so that the requests having ranks corresponding to the selected bits are enabled.

8. The method of claim 7 wherein the step of forcing is performed only if the acknowledged enabled request does not correspond to any of the selected bits of the mask.

9. A circular priority encoder, comprising:

a mask register, receiving a plurality of requests and holding a mask, the mask register outputting only those requests enabled by the mask;

a linear encoder, receiving the output of the mask register, and outputting an acknowledgment that identifies one of the requests enabled by the mask; and a mask generator receiving the acknowledgment and providing a new mask to replace the mask stored in the mask register, the new mask being derived from the acknowledgment.

10. The circular priority encoder of claim 9 further including means for initializing the mask register to an initial state, when the linear encoder provides an output indicative of no acknowledgment.

11. The circular priority encoder of claim 10 wherein the initial state of the mask register is a state in which the mask enables all of the plurality of requests.

12. The circular priority encoder of claim 9 wherein each of the plurality of requests has a corresponding rank, one of the plurality of requests having a lowest rank, and the output of the linear encoder includes only an acknowledgment that corresponds to the one of the plurality of requests having the lowest rank.

13. The circular priority encoder of claim 9, further comprising:

means for determining selected bits corresponding to requests of high rank; and means for forcing the selected bits of the new mask to an active state, so that the circular priority encoder processes the requests of high rank circularly, and processes the requests of rank other than high rank linearly.

14. The circular priority encoder of claim 13 wherein the active state enables transmission of the corresponding requests received by the mask register.

15. The circular priority encoder of claim 13 further including means for replacing the mask stored in the mask register with the new mask only when the acknowledgment provided by the linear encoder results from a mask bit that was not one of the selected bits forced by the means for forcing.

16. The circular priority encoder of claim 13, wherein:

each of the plurality of requests has a corresponding rank, one of the plurality of requests having a lowest rank;

the new mask includes a plurality of bits, each of the plurality of bits corresponding to a respective rank; and the means for forcing includes means for forcing the bit of the new mask corresponding to the lowest rank and any bits of the new mask corresponding to a rank lower than the lowest rank, to the active state.

17. A method for prioritizing and acknowledging requests, comprising the steps of:

receiving a first plurality of requests during a first time period, each of the first plurality of requests having a respective priority;

receiving a second plurality of requests during a second time period that is subsequent to the first time period, each of the second plurality of requests having a respective priority;

acknowledging each of the first plurality of requests in an order corresponding to the respective priority of each of the first plurality of requests; and subsequent to the step of acknowledging each of the first plurality of requests, acknowledging each of the second plurality of requests in an order corresponding to the respective priority of each of the second plurality of requests.

18. The method of claim 17 wherein the step of acknowledging each of the first plurality of requests includes the steps of:

masking the first plurality of requests with a mask to provide a plurality of enabled requests; and acknowledging an enabled request of the plurality of enabled request having a lowest rank of the plurality of enabled requests.

19. The method of claim 18 further comprising a step of initializing the mask to an initial state in which all of the first plurality of requests are enabled.

20. An apparatus for prioritizing and acknowledging requests, comprising:

means for receiving a first plurality of requests during a first time period, each of the first plurality of requests having a respective priority;

means for receiving a second plurality of requests during a second time period that is subsequent to the first time period, each of the second plurality of requests having a respective priority;

first means for acknowledging each of the first plurality of requests in an order corresponding to the respective priority of each of the first plurality of requests; and second means for acknowledging each of the second plurality of requests, subsequent to the first means for acknowledging acknowledging each of the first plurality of requests, in an order corresponding to the respective priority of each of the second plurality of requests.

21. The apparatus of claim 20 wherein the means for acknowledging each of the first plurality of requests includes:

means for masking the first plurality of requests with a mask to provide a plurality of enabled requests; and means for acknowledging an enabled request of the plurality of enabled request having a lowest rank of the plurality of enabled requests.

22. The apparatus of claim 21 further comprising a means for initializing the mask to an initial state in which all of the first plurality of requests are enabled.

23. An apparatus for acknowledging a plurality of requests, each of the plurality of requests having an associated rank, the apparatus comprising:

means for receiving the plurality of requests;

means for masking the plurality of requests with a request mask to provide a plurality of enabled requests;

means for acknowledging an enabled request of the plurality of enabled requests having a lowest rank of the ranks associated with the plurality of enabled requests; and means for providing a new mask to replace the request mask, the new mask enabling only those requests having a rank higher than the acknowledged request.

24. The apparatus of claim 23 further including:

means for detecting when the means for acknowledging does not acknowledge any request; and means, responsive to the means for detecting, for providing an initial mask that enables all requests, to replace the request mask.

25. The apparatus of claim 23 further including means for forcing selected bits of the request mask to a predetermined state so that the requests having ranks corresponding to the selected bits are enabled.

26. The apparatus of claim 25 wherein the means for forcing includes means for forcing the selected bits only if the acknowledged enabled request does not correspond to any of the selected bits.

* * * * *